(12) United States Patent
Stein

(10) Patent No.: US 8,998,336 B2
(45) Date of Patent: Apr. 7, 2015

(54) HEAD RESTRAINT HAVING AN ANTI-TURN MECHANISM

(75) Inventor: Alexander Stein, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 119 days.

(21) Appl. No.: 13/818,532

(22) PCT Filed: May 3, 2011
(Under 37 CFR 1.47)

(86) PCT No.: PCT/EP2011/057034
§ 371 (c)(1),
(2), (4) Date: Sep. 5, 2013

(87) PCT Pub. No.: WO2012/025257
PCT Pub. Date: Mar. 1, 2012

(65) Prior Publication Data
US 2014/0232160 A1      Aug. 21, 2014

(30) Foreign Application Priority Data
Aug. 23, 2010   (DE) .......................... 10 2010 035 139

(51) Int. Cl.
*B60N 2/48*          (2006.01)
(52) U.S. Cl.
CPC ................ *B60N 2/4805* (2013.01); *B60N 2/48* (2013.01); *B60N 2/4808* (2013.01); *B60N 2/4817* (2013.01)
(58) Field of Classification Search
CPC ....... B60N 2/4817; B60N 2/4808; A47C 7/38
USPC .................................................. 297/410, 391
See application file for complete search history.

(56) References Cited

U.S. PATENT DOCUMENTS

| | | | |
|---|---|---|---|
| 4,256,341 A | | 3/1981 | Goldner et al. |
| 5,257,853 A | * | 11/1993 | Elton et al. .................... 297/391 |
| 7,070,240 B2 | | 7/2006 | Schmitt et al. |
| 2004/0113480 A1 | | 6/2004 | Reed et al. |
| 2004/0245834 A1 | | 12/2004 | Schmitt et al. |
| 2006/0214491 A1 | | 9/2006 | Metz et al. |
| 2010/0072695 A1 | | 3/2010 | Grasmuck et al. |

FOREIGN PATENT DOCUMENTS

| | | |
|---|---|---|
| CN | 101683930 A | 3/2010 |
| DE | 30 45 391 A1 | 6/1982 |
| DE | 32 00 321 A1 | 7/1983 |

(Continued)

OTHER PUBLICATIONS

Office Action dated May 7, 2014 received in corresponding Japanese Patent Application No. 2013-525193.

(Continued)

*Primary Examiner* — Milton Nelson, Jr.
(74) *Attorney, Agent, or Firm* — Foley & Lardner LLP

(57) ABSTRACT

A head restraint assembly is provided for the rotationally secure arrangement of a head restraint on a vehicle seat formed from a backrest and a seat base part. The head restraint is arranged on the backrest by at least one head restraint rod such that the height thereof can be adjusted. A region is formed at an upper end of each head restraint rod. In the region the course of the head restraint rods defines a curve having a radius. The head restraint rods are arranged with the curved region in the head restraint in a form-fitting manner.

8 Claims, 3 Drawing Sheets

(56) References Cited

FOREIGN PATENT DOCUMENTS

| | | |
|---|---|---|
| DE | 3200321 A1 * | 7/1983 |
| DE | 83 03 896 U1 | 5/1984 |
| JP | 48-017982 S | 2/1948 |
| JP | 2004-527278 A | 9/2004 |
| JP | 2006-520226 A | 9/2006 |

OTHER PUBLICATIONS

International Search Report received in connection with international application No. PCT/EP2011/057034; dtd Jul. 19, 2011.
Office Action dated Sep. 23, 2014, in corresponding Chinese Application No. 201180040980.2, and English translation, 11 pages.
Machine translation of DE 201 10 342 U1, Dated Sep. 11, 2014.

* cited by examiner

HEAD RESTRAINT HAVING AN ANTI-TURN MECHANISM

CROSS REFERENCE TO RELATED APPLICATIONS

The present application is a National Stage of International Application No. PCT/EP2011/057034 filed on May 3, 2011, which claims the benefit of German Patent Application No. 10 2010 035 139.3 filed on Aug. 23, 2010, the entire disclosures of which are incorporated herein by reference.

The invention relates to a headrest arrangement for arranging a headrest in a rotationally secure manner on a vehicle seat formed from a backrest and a seat face portion according to the preamble of claim 1.

In the prior art, the round cross-section of the headrest rods in the region in which the headrest rods are arranged in the headrest member is flattened. A receiving region in the headrest member is constructed so as to correspond to the flattened portion. This flattened portion results in a lever arm which acts counter to rotation or torsion of the headrest about the vertical axis of the vehicle.

DE 201 10 342 U1 describes a headrest arrangement for a vehicle seat comprising a backrest and a lower seat face portion, having a headrest portion which is connected or can be connected to the backrest by means of retention means, the retention means being constructed in such a manner that the headrest portion can be moved between a position for use which is arranged above the backrest in accordance with the headrest function thereof and a non-use position and is releasably locked in both positions, the headrest portion in the non-use position being lowered with respect to the position for use, on the one hand, in the direction of the seat face portion and, on the other hand, being arranged horizontally in front of the backrest in the region of a front side of the backrest.

An object of the present invention is to provide for a headrest on a vehicle seat an anti-rotation mechanism which is improved over the prior art and which is in particular more capable of bearing loads.

With regard to the headrest arrangement for arranging a headrest in a rotationally secure manner on a vehicle seat formed from a backrest and a seat face portion, the object is achieved by the features set out in claim 1.

Advantageous developments of the invention are set out in the dependent claims.

In the headrest arrangement for arranging a headrest in a rotationally secure manner on a vehicle seat formed from a backrest and a seat face portion, the headrest being arranged on the backrest by means of at least one headrest rod so as to be adjustable in terms of height, according to the invention there is formed at an upper end of each of the headrest rods a region in which the path of the headrest rods describes a curvature having a radius, the headrest rods having the curved region being arranged in the headrest in a positive-locking manner. There consequently results in comparison with the prior art an enlarged lever arm which acts counter to rotation of the headrest and in particular of the headrest rods relative to each other. Consequently, a headrest arrangement according to the invention and in particular the rotation prevention thereof are more capable of bearing loads compared with the prior art and more resistant with respect to rotation.

The curvature is preferably constructed with a constant radius, the size of the lever arm and the resistance force resulting therefrom counter to the rotation of the headrest advantageously being able to be adjusted and/or varied by means of the radius of curvature of the headrest rod.

In an advantageous embodiment, an inner side of the curvature is orientated in the region in the travel direction of the vehicle. This enables particularly large forces to be received and confers on the headrest rods additional mechanical stability.

In a particularly advantageous manner, the headrest rods are formed from a pipe portion having a round cross-section. A curvature, in comparison with a conventional flattened portion, can be applied in a more cost-effective manner to a headrest rod having a round cross-section. Furthermore, risk of injury to the vehicle occupants is reduced since a headrest rod having a round cross-section has no edges at all from which injuries may result.

In a particularly preferred manner, a receiving region is integrally shaped or formed on the headrest member at each of the two sides of a headrest member of the headrest. The headrest member can thereby be produced in a cost-effective and rapid manner, in particular with industrial scale production.

The receiving region for the headrest rods is formed in the headrest member so as to correspond to the headrest rods. In a preferred embodiment, the receiving region comprises a recess which is formed in terms of extent and cross-section so as to correspond to the region of the headrest rods. This enables play-free, positive-locking and consequently rotationally secure arrangement of the headrest member on the headrest rods.

During operation of the headrest, the curved region of each headrest rod is preferably arranged completely or almost completely in a positive-locking manner in the recesses of the headrest member.

In a particularly advantageous embodiment, the headrest member is produced in an integral manner from a plastics material or a plastics admixture using a casting or injection-molding method. The headrest member may thereby be produced with industrial scale production in a particularly advantageous manner using a conventional casting or injection-molding method whose method parameters are known and can be well controlled.

The invention is explained in greater detail with reference to the appended schematic figures, in which:

FIG. 1 is a schematic, perspective view of a headrest having an anti-rotation mechanism, FIG. 2 is a schematic front view of a headrest having an anti-rotation mechanism and FIG. 3 is a schematic cross-section of a headrest having an anti-rotation mechanism.

Components which correspond to each other are given the same reference numerals in all the figures.

The headrest 1 comprises at least two headrest rods 2.1 and 2.2 and a headrest member 3.

A piece of headrest upholstery (not illustrated) and/or a headrest cover can be fitted to the headrest member 3.

The headrest member 3 is preferably produced from plastics material using a conventional casting or injection-molding method.

The headrest rods 2.1 and 2.2 are substantially formed from a pipe portion having a round cross-section.

A lower end 4 of the headrest rods 2.1 and 2.2 is formed so as to correspond to a conventional recess (not illustrated) in a backrest of a vehicle seat and is arranged in this recess of the backrest during operation of the headrest 1, respectively.

Figure 1:
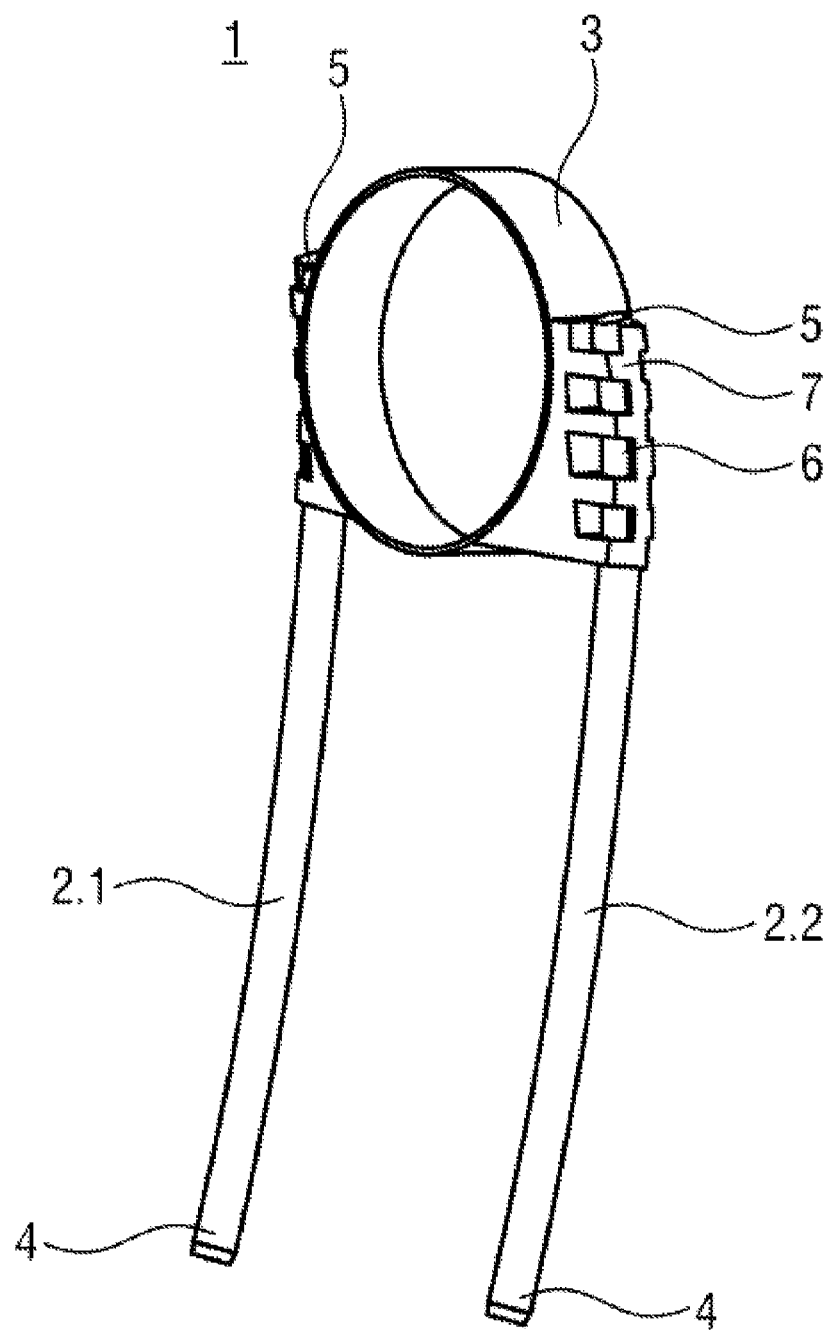
FIG. 1 is a schematic, perspective view of a headrest 1 having an anti-rotation mechanism.
Figure 2:
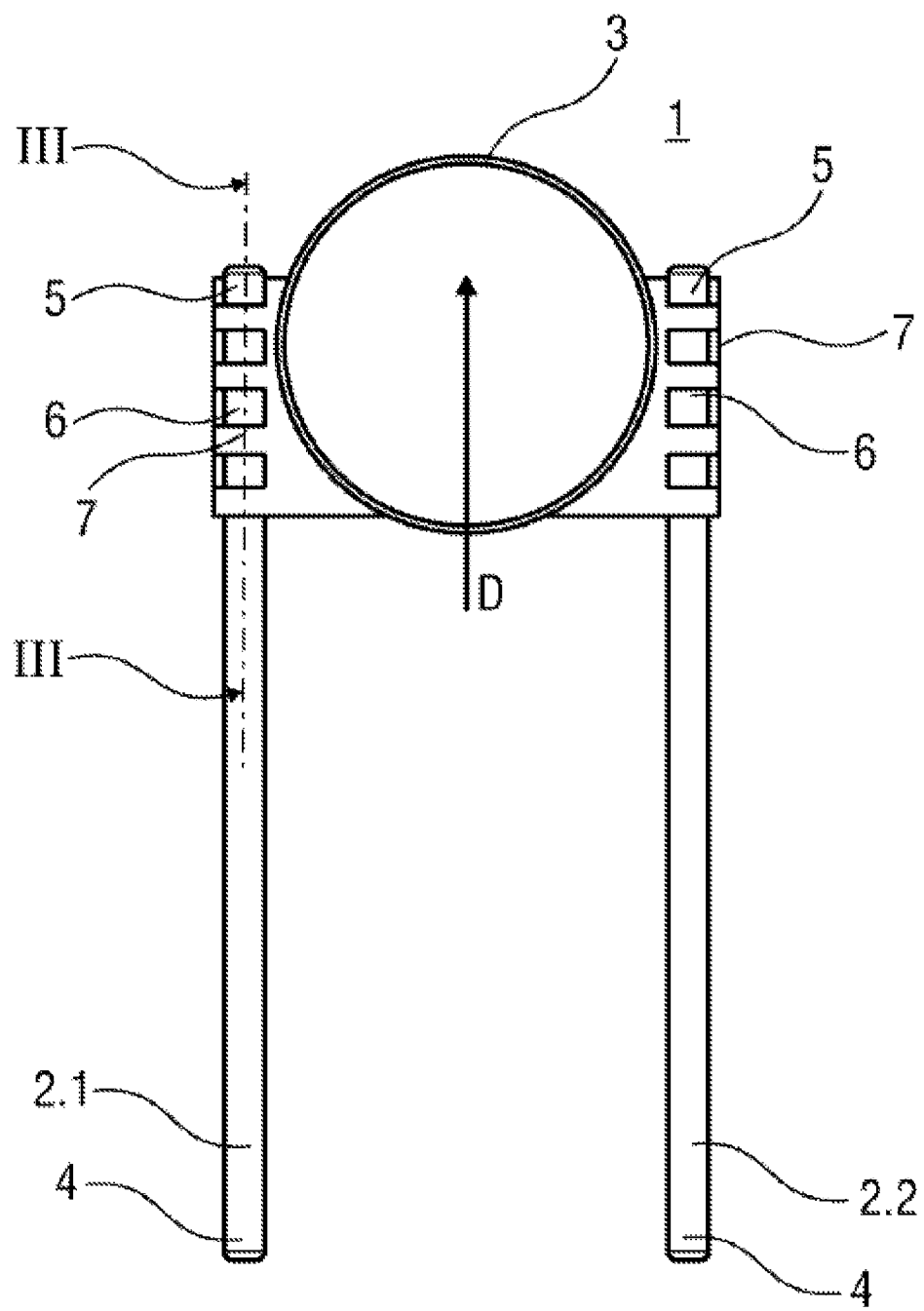
FIG. 2 is a schematic front view of the headrest 1 having the anti-rotation mechanism.
Figure 3:
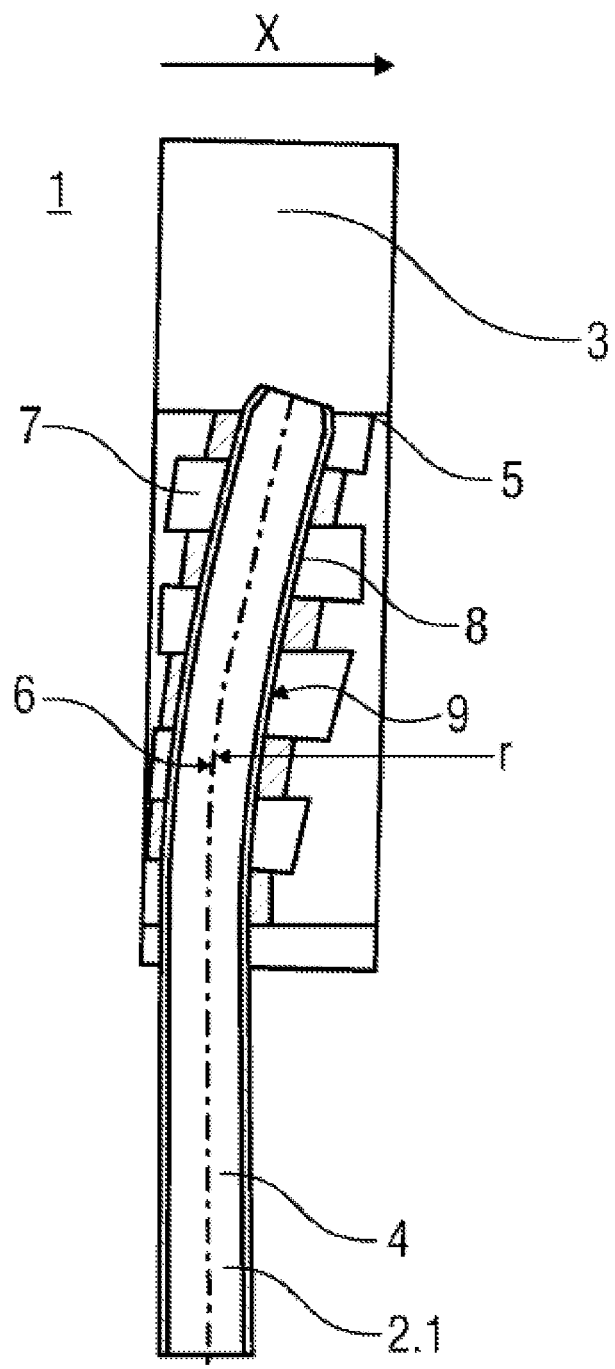

At an upper end 5 of the headrest rods 2.1 and 2.2, respectively, there is formed a region 6 in which the path of the headrest rods 2.1 and 2.2 describes a curvature having a radius r, as illustrated in FIG. 3. The radius r is constant over the entire path of the curvature.

At each of the two sides of the headrest member 3, a receiving region 7 is shaped or formed on the headrest member 3. In a particularly advantageous manner, the receiving regions 7 are formed integrally on the backrest member 3 so that the headrest member 3 and receiving regions 7 form one structural unit. Each receiving region 7 comprises a recess 8 which is formed in terms of extent and cross-section so as to correspond to the region 6 of the respective headrest rods 2.1 and 2.2.

The extent of the recess 8 is orientated in such a manner that an inner side 9 of the curvature is orientated in the travel direction X.

During operation of the headrest 1, the region 6 of each headrest rod 2.1 and 2.2 is completely or almost completely arranged in a positive-locking manner in the respective recesses 8 of the headrest member 3.

As a result, during operation of the headrest 1, the two upper ends 5 of the headrest rods 2.1 and 2.2 are inclined in the travel direction X.

Owing to the play-free and rotationally secure arrangement of the headrest rods 2.1 and 2.2 in the recesses 8 of the headrest member 3, the headrest 1 is reliably prevented from rotating about a rotation axis D which extends in the region of the headrest member 3 substantially parallel with the vehicle vertical axis.

According to the invention, the headrest rods 2.1 and 2.2 are reliably prevented from rotating in the recesses 8 of the headrest member 3 about a longitudinal axis of the headrest rods 2.1 and 2.2 by the curvature in the region 6 of the headrest rods 2.1 and 2.2, respectively.

During operation of the headrest 1, such a rotation occurs, for example, in the event of a force which acts asymmetrically on the headrest 1 and in particular the headrest member 3.

In this instance, for example, the headrest rod 2.1 nearest the force introduction location in the travel direction X is displaced backwards. The headrest rod 2.2 which is coupled to this headrest rod 2.1 by means of the headrest member 3 is, as a result of the rotation of the headrest member 3 about the rotation axis D, displaced in the opposite direction forwards. Depending on the size of the active asymmetric force, for example, it is possible for conventional headrest rods to collapse as a result of this rotation.

Using the present invention, the positive-locking arrangement of two headrest rods 2.1 and 2.2 with a curved region 6 in the headrest member 3, the headrest 1 is prevented from rotating about the rotation axis D.

LIST OF REFERENCE NUMERALS

1 Headrest
2.1, 2.2 Headrest rod
3 Headrest member
4 Lower end
5 Upper end
6 Region
7 Receiving region
8 Recess
9 Inner side
X Travel direction
D Rotation axis
r Radius

The invention claimed is:

1. A headrest arrangement for arranging a headrest in a rotationally secure manner on a vehicle seat formed from a backrest and a seat face portion, comprising:
 a headrest;
 at least one headrest rod configured to position the headrest on the backrest so as to be adjustable in height,
 wherein an upper end of the at least one headrest rod includes a curved region,
 wherein, in the curved region, a path of the at least one headrest rod defines a curvature having a radius, the at least one headrest rod having the curved region being configured to positively lock in the headrest,
 wherein a concave side of the curvature faces a travel direction, and
 wherein the at least one headrest rod is essentially straight in a portion other than the curved region.

2. The headrest arrangement as claimed in claim 1, wherein the curvature in the curved region is defined by a constant radius.

3. The headrest arrangement as claimed in claim 1, wherein a headrest member of the headrest comprises a plastics material or a plastics admixture and formed via casting or injection-molding.

4. The headrest arrangement as claimed in claim 1, wherein the at least one headrest rod is formed from a pipe portion having a round cross-section.

5. The headrest arrangement as claimed in claim 1, wherein, at each of two sides of a headrest member of the headrest, a receiving region is shaped or formed on the headrest member.

6. The headrest arrangement as claimed in claim 5, wherein the receiving region for the at least one headrest rod is formed in the headrest member so as to correspond to the at least one headrest rod.

7. The headrest arrangement as claimed in claim 5, wherein the receiving region comprises a recess corresponding in contour and cross-section to the region of the at least one headrest rod.

8. The headrest arrangement as claimed in claim 7, wherein, during operation of the headrest, the curved region of the at least one headrest rod is arranged to positively engage with recesses of the headrest member.

* * * * *